United States Patent [19]

Engel

[11] Patent Number: 5,040,866
[45] Date of Patent: Aug. 20, 1991

[54] DEVICE FOR COUPLING LIGHT INTO AN OPTICAL WAVEGUIDE

[75] Inventor: Reinhard Engel, Munich, Fed. Rep. of Germany

[73] Assignee: Siemens Aktiengesellschaft, Munich, Fed. Rep. of Germany

[21] Appl. No.: 755,276

[22] Filed: Jul. 15, 1985

[30] Foreign Application Priority Data

Aug. 14, 1984 [DE] Fed. Rep. of Germany ....... 3429947

[51] Int. Cl.⁵ .......................... G02B 6/26; G02B 6/42
[52] U.S. Cl. ....................................................350/32
[58] Field of Search ............... 350/96.15, 96.16, 96.20, 350/96.29

[56] References Cited

U.S. PATENT DOCUMENTS 4,586,783 5/1986 Campbell et al. ............... 350/96.15
4,618,212 10/1986 Ludington et al. ............. 350/96.20
4,637,682 1/1987 Mahlein et al. ................. 350/96.15

FOREIGN PATENT DOCUMENTS 1525985 9/1978 United Kingdom .
2100463 12/1982 United Kingdom .
2144239 2/1985 United Kingdom .

Primary Examiner—William L. Sikes
Assistant Examiner—Robert E. Wise
Attorney, Agent, or Firm—Hill, Van Santen, Steadman & Simpson

[57] ABSTRACT

An apparatus for coupling light into and out of optical waveguides to determine the amount of splicing attenuation at a splicing location between a first and second waveguide, characterized by a device for coupling light into the first waveguide and a device for coupling light out of the second waveguide. The device for coupling light into the first waveguide includes an arrangement for holding a portion of the first waveguide in a curved path to form a coupling region, a source of light and an additional optical waveguide for conducting light from the source to the coupling region. The output coupling device includes an arrangement for holding the second waveguide in a curved path, a photodetector for receiving light uncoupled from the second waveguide and an arrangement for measuring the intensity of the light received by the photodetector.

20 Claims, 3 Drawing Sheets

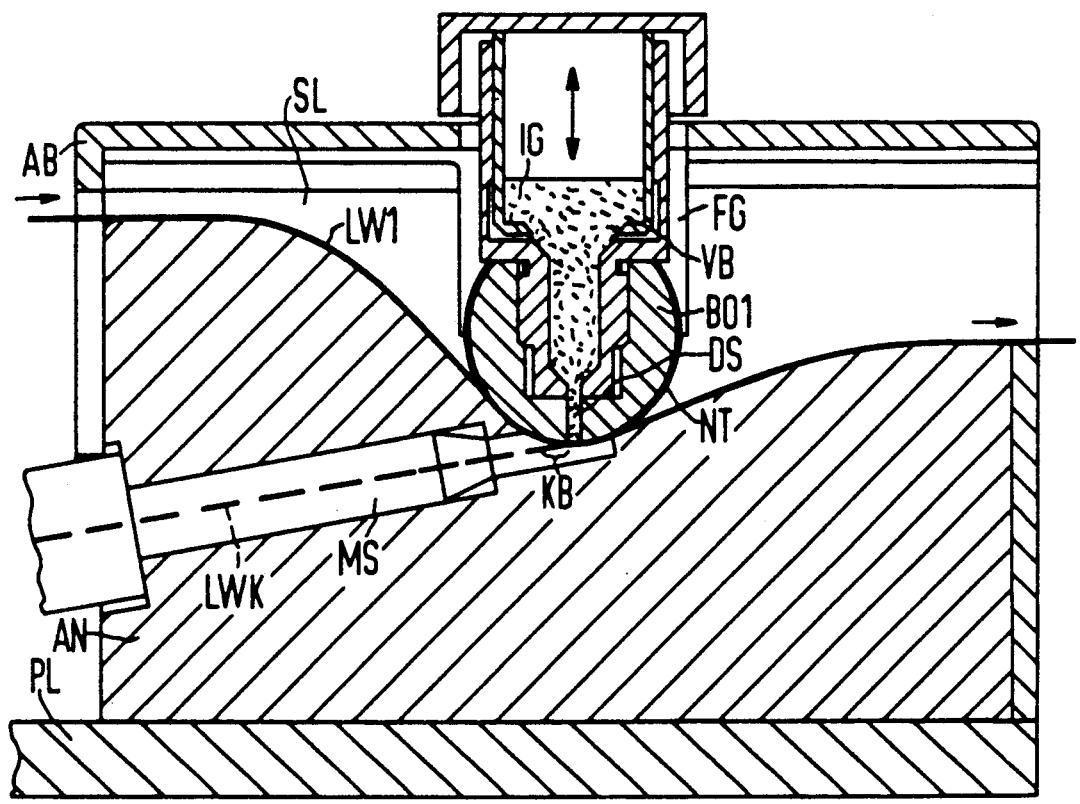

1

DEVICE FOR COUPLING LIGHT INTO AN OPTICAL WAVEGUIDE

BACKGROUND OF THE INVENTION

The present invention is directed to an apparatus for coupling light into an optical waveguide before a splicing location for the purpose of assessing splicing attenuation at a splicing location between the optical waveguide and a second optical waveguide, the apparatus includes means for guiding the first waveguide to be spliced in a specific curved fashion to form a coupling region so that light is coupled into the waveguide without removing a coating therefrom.

A coupling device in which the waveguide is held in a curved path is disclosed in German Patent No. 2,626,839. However, the details regarding the construction of the coupling region are not disclosed in this patent.

From the disclosure of German OS No. 3,215,669, a coupling device is known in which before the splicing location, the optical waveguide is subjected to a definite curvature. Simultaneously, the light is supplied through a lens to a block, which consists of a polysiloxane or other material which can be deformed in a springy fashion to enable coupling the light into the waveguide.

SUMMARY OF THE INVENTION

The object of the present invention consists in conducting light in a definite fashion and in a fashion, which is reproducible at any time, for input coupling of the light in a coupling region and through as precise as possible alignment of the light rays to be input-coupled to guarantee, with a low outlay, a secure-striking light input feeding operation with a high coupling efficiency.

In order to accomplish these goals, the present invention is directed to an improvement in a device for coupling light into a first optical waveguide before a splicing location between the first optical waveguide and a second optical waveguide for aiding in determining the attenuation of light at the splicing location, said device including a light source and means for guiding the first waveguide in a curved path to form a coupling region so that light can be coupled therein without requiring the removal of the coating of the waveguide. The improvement includes an additional optical waveguide for receiving light from the source and extending to the coupling region and means for aligning a core region of the additional waveguide with the core of the first optical waveguide.

In contrast with broad-surface or area input couplings, which use blocks consisting of polysiloxane, for example, the present invention supplies the light in a strictly bundled fashion by means of an additional optical waveguide, which through its alignment to the core region of the first optical waveguide guarantees that the light passes through the coating of the first optical waveguide to a sufficient extent and reaches the core of the first optical waveguide with losses which are as low as possible. The greater the input coupled light energy and the more definite and more precise the input coupling, which takes place, respectively, the more exact the optimum alignment of the waveguide cores of the first and second waveguide can be adjusted, which alignment is determined through the comparison between the quantity of input-coupled light and the quantity of light output-coupled after the splicing location. In the case of an imprecise poorly reproducible input or output coupling location, the light power coupled over at the splicing location is so small that the photocurrent brought about in the receiving diode is covered or strongly disturbed by diode-inherent noise currents. An insufficient signal-to-noise ratio leads to an insufficient resolvability of the signal and prevents the exact precise location of the optical position of the fiber ends to be connected and the exact positioning is less than 0.1 $\mu$m.

Because of the greater attainable precision and reproducibility, the device of the present invention is particularly suitable for use in the case of monomode fibers whose very small core diameter in the case of slightly directed input coupling receives too low a light radiation. It must be taken into consideration here that for the optical quality of the splice, the precise as possible alignment of the core region and not the cladding region is decisive.

In the case of the invention, because of the directed input coupling via the optical waveguide fiber, the component of stray light is kept particularly low so that economical luminescent diodes can replace expensive but light-intensive laser diodes as the transmitting element or light source. In addition, through the direct excitation of the core light, special measures for cladding light stripping can be dispensed with if more than 5 cm ACC=Polyurethane-acrylate coated fiber is disposed between the June 28, 1985 coupling location and the fiber end to be adjusted.

It is expedient if the core region of the additional optical waveguide exhibits a larger diameter than the core region of the first optical waveguide to be spliced. This applies, in particular, to the input coupling into monomode fibers to be spliced whose core diameters are very small so that possible tolerance values, for example, eccentricity, would otherwise lead to greatly differing input-coupling attenuations. On the other hand, the core diameter of the additional optical waveguide should also not be selected to be too large because otherwise correspondingly more stray light results and thus the input coupling would exhibit a lesser efficiency. It is expedient to select the core region of the optical waveguide serving the purpose of input-coupling to be approximately 50 to 100% greater than the tolerance range which results from the sum of the coating diameter fluctuations which are 250 $\mu$m $\mp$20 $\mu$m; the core eccentricities, which is less than 5 $\mu$m; and the position uncertainty in the arrangement.

Other advantages and details of the invention will be readily apparent from the following detailed description, drawings and claims.

BRIEF DESCRIPTION OF THE DRAWINGS

FIG. 4 is a cross-sectional view with portions in elevation for purposes of illustration of the input-coupling device of the invention.

DESCRIPTION OF THE PREFERRED EMBODIMENTS

Figure 1:
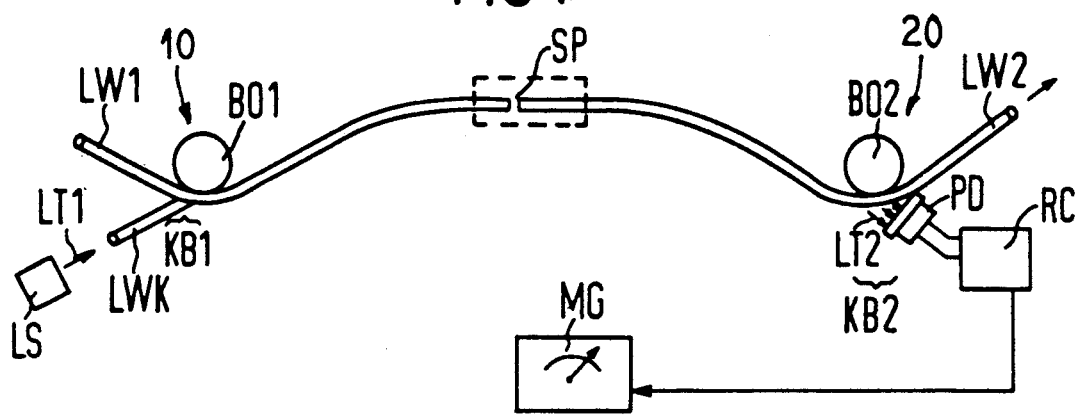
FIG. 1 is a schematic illustration of the basic construction of an apparatus according to the present invention which has a device for coupling light into a first optical fiber to be spliced to a second optical fiber and to couple light out of the second optical fiber.

As illustrated in FIG. 1, a first optical waveguide LW1 and a second optical waveguide LW2 are to be spliced together. Each of these waveguides is provided on the exterior with a coating which serves the purpose of mechanical protection of the optical waveguide fiber and it is assumed that this coating is transmissive to light of a wavelength of 850 nm. As illustrated in the figure, a splicing location SP at which the two ends of the waveguides LW1 and LW2 are spliced together in a known manner such as by cementing or welding is illustrated. In order to be able to obtain the alignment of the fiber ends at the splicing location SP, the apparatus of the present invention is provided and include a device generally indicated at 10 in FIG. 1 for coupling light into the first waveguide LW1 before or ahead of the splicing location SP and a device generally indicated at 20 for coupling light out of the second waveguide LW2 after the splicing location SP. By comparing the quantity of the light input-coupled into the first waveguide LW1 and the quantity of light output-coupled from the second waveguide LW2, the quality of the core alignment in the region of the splicing location SP can be determined. It should be noted that when stating before or ahead of the splicing location it is referring to the direction of light traveling in the first waveguide LW1 to the splicing location and traveling into the second waveguide LW2 as indicated by the arrows and which is indicated in FIG. 1 as being from left to right.

In detail, at the input-coupling device 10, a light source LS is provided to produce light rays LT1 which are schematically illustrated as an arrow and are directed into an additional light waveguide LWK. Preferably, the light source LS is a luminescent diode. The additional light waveguide LWK is also cladded and exhibits expediently a large core diameter preferably between 50 and 100% larger than a tolerance range which results from the sum of the coating diameter fluctuations (250 $\mu$m $\mp$20 $\mu$m); core eccentricities ($<$5 $\mu$m); and position unreliability of the core and fiber of the light waveguide LW1. In this manner, there is available in a coupling region KB1 a light ray which is strongly bundled by the core of the optical waveguide LWK and which light ray is aligned at a specific angle to the optical waveguide LW1 or its core which waveguide LW1 is to be spliced. In order to make possible the input-coupling, the optical waveguide LW1 is guided in a coupling region KB1 around a cylindrical pin or member BO1. Details regarding the angle to be observed will be explained hereinafter and particularly with regard to FIG. 2. Through the strongly bundled rays which emerge from the optical waveguide LWK and extend through the coating of the optical waveguide LW1 to its core, it is guaranteed that the light quantity, which is always as great as possible, is coupled from the additional waveguide LWK into the first optical waveguide LW1 which is to be spliced. Precautions must merely be exercised here to insure that not too great a transverse displacement between the optical waveguide LW1 and an additional waveguide LWK occur and that the alignment which may be accomplished through corresponding grooves or the like remains the same from one optical waveguide to the next, respectively.

The input-coupled light passes through the splicing location SP where an adjustment mechanism (not illustrated) is provided. With the aid of the adjustment mechanism, a precisely aligned alignment of the cores of the two optical waveguides LW1 and LW2 is carried out for the purpose of optimizing the splicing location. After the splicing location SP, an additional optical coupling region KB2 is provided for the optical waveguide LW2. This additional coupling region includes a pin or member BO2 which causes the waveguide LW2 to have a desired curvature from which the greatest possible portion of light contained in the waveguide LW2 will emerge. By means of a photodiode PD, this emerging light is captured and supplied in the form of an electrical signal by a receiving device RC to a measuring apparatus MG.

Because of the alignment of the optical waveguide LWK to the core of the optical waveguide LW1 which is to be spliced, a very high coupling efficiency, which is better than $-30$ dB in the case of monomode fibers, is achieved. This is on account of the losses which are relatively low in this region and on account of the high signal-to-noise ratio resulting therefrom on the receiver side. Thus, the alignment of the fiber ends of the waveguides LW1 and LW2 can proceed with high precision.

Figure 2:
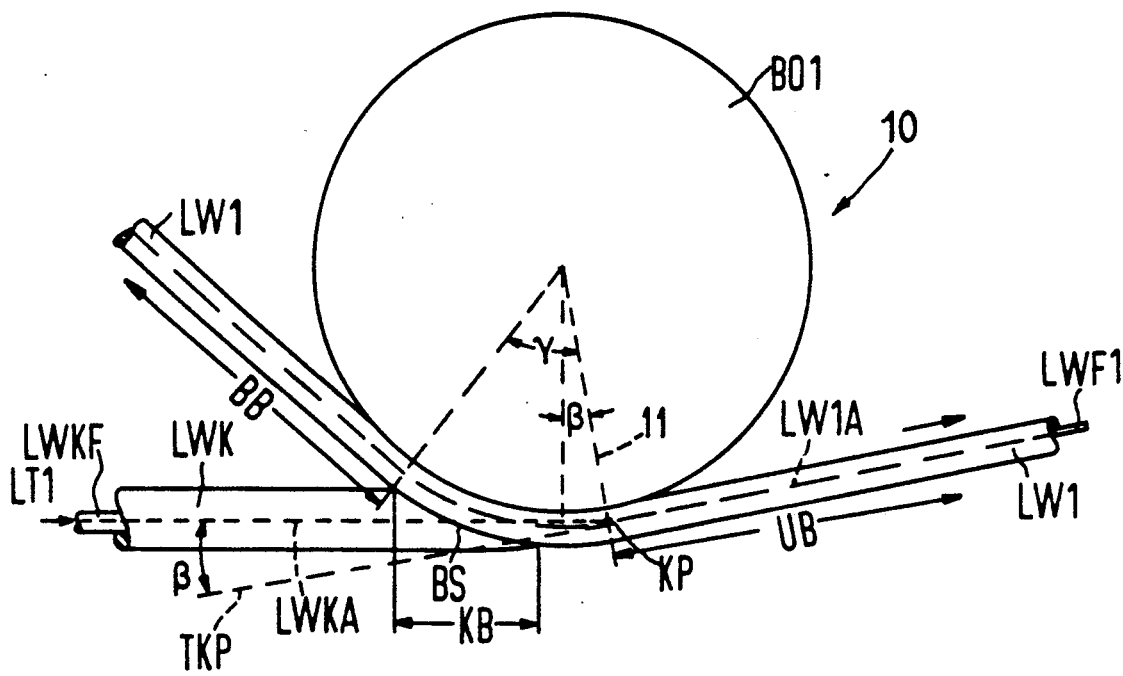
FIG. 2 is an enlarged presentation of the device for coupling light into the optical waveguides.

The input-coupling of light via the optical waveguide LWK proceeds expediently under very specific angular relation which shall be explained with regard to FIG. 2. In an enlarged illustration, a pin or cylinder BO1 is illustrated via which the optical waveguide LW1 is guided in a partial region on a circular arc segment. The angular region at which the optical waveguide LW1 runs into a curved fashion and rests against the cylindrical surface of the pin or member BO1 is the angle of contact or wrap $\gamma$ and is selected to be in a range between 30° and 50°. The region BB of the optical waveguide LW1 to the left of the pin BO1 no longer rests against the surface of the pin or member. In a similar way, region UB, which is on the right side of the coupling region, also no longer rests on the surface of the pin and both these regions BB and UB will have only a small or negligible curvature. In the present example, it is assumed that the splicing location lies to the right of the pin BO1, i.e., in the region UB. The axis of the optical waveguide LW1 is illustrated by a broken line LW1A. Moreover, in the case of a portion of the optical waveguide LW1, at its right end, the coating is removed so that only the actual optical waveguide fiber LWF1 can be seen and this fiber consists of a glass core and glass cladding. Customarily, the splicing operation, for example, through welding, is carried out in the area which has the external coating removed therefrom.

The additional optical waveguide LWK serving for the purpose of input coupling of the light LT1 required for the measurement at the splicing location runs somewhat less than tangentially to the optical waveguide LW1. The geometric relation of the coupling region KB lies within relatively narrow tolerance values if a high-coupling efficiency is to be obtained. The additional optical waveguide LWK also exhibits a coating wherein at the left portion for purposes of clarification and illustration, a section of the coating has been removed and only the optical waveguide LWKF, which consists of the glass core and cladding glass, is visible. The additional optical waveguide LWK has an axis LWKA which is illustrated as a broken line. KP designates that point from which the optical waveguide LW1 no longer proceeds in the curved fashion, i.e., virtually becomes removed from contact with a surface of the pin BO1. The coupling point KP thus lies at a right leg 11 of the angle of contact or wrap γ. As illustrated, an extended axis LWKA of the optical waveguide LWK meets the axis LW1A of the optical waveguide LW1 at the point KP for the second time. This is because the two axes have already crossed at a point to the left of the point KP. If the intersection point between the axis LWKA and the axis LW1A occurs at the point KP, a tangent TKP at the point KP will form an angle β in relation to the axis LWKA of the additional optical waveguide LWK. The angle β should expediently be selected to be as small as possible, preferably in a range of 7° to 15°. It is also noted that a line extending perpendicular to the axis LWKA through the center of the member BO1 with a right leg 11 of the angle of contact γ also will be the angle β. The angle between the axis LWKA and the right leg 11 of the angle γ is thus an acute angle with a value 90° − β.

The optical waveguide LWK has an end face which is shaped in a curved fashion, namely, concavely. The curvature has a radius which corresponds to the radius of the pin BO1 plus the diameter of the optical waveguide LW1. This end face altogether forms a coupling region which is referenced KB. However, the coating of the additional optical waveguide LWK is thus calculated as jointly belonging to the coupling region. In reality, however, the light transmission occurs only in the region of the actual fiber and in precise terms, only at the end face of the core of the optical waveguide fiber LWKF.

The selected arrangement of the coupling point KP so that it virtually lies at the end of the curved region of the optical waveguide LW1 yields a particularly high coupling efficiency. This is caused essentially from a fact that the optical waveguide LW1 no longer or only still very slightly runs in a curved fashion and hence through the following minor curvature. Thus, light emission and hence an attenuation no longer will occur. By contrast, if, for example, the coupling point were placed in the center of the contact or wrap region, through the following curvature, say by γ/2, the input-coupled light from the core region of the optical waveguide LW1 will partially again emerge and thus be lost.

The angle of contact or wrap γ should also be kept as small as possible in order to keep the bending-stressed portion of the optical waveguide LW1 as short as possible. The longer that this bending-stressed portion is, the greater would be the later breakage probability due to microcracks in the surface brough about by the bending. The angle γ should expediently be selected in a range of between 20° and 50°. The pin or member BO1 has a diameter in a range of 1.5 to 6 mm.

Figure 3:
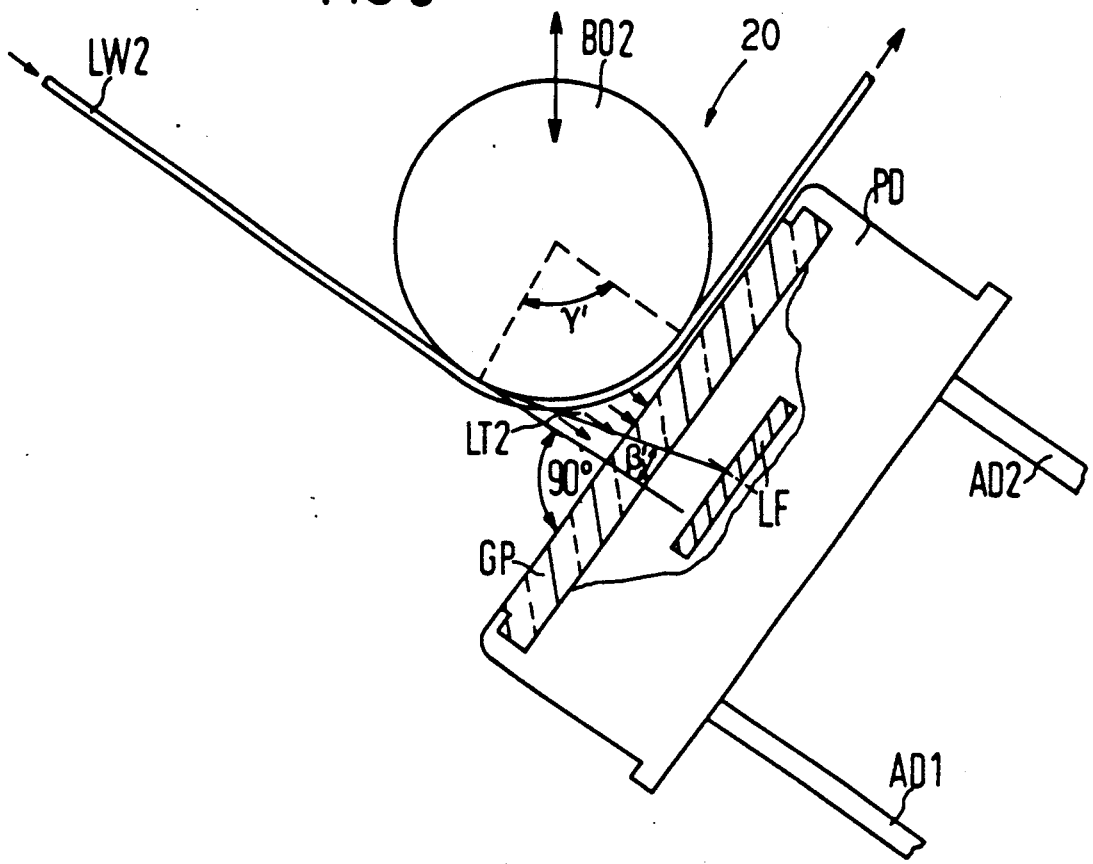
FIG. 3 is an enlarged detail of the output coupling device.

The output coupling device 20 is best illustrated in FIG. 3 and is positioned behind the splicing location. For this purpose, the second optical waveguide LW2 is guided on a pin BO2 which preferably has the same curvature or the same diameter as the pin BO1. Also, the angle of contact γ' between the second optical waveguide LW2 and the surface of the pin or cylinder BO2 should approximately have the same value as the angle of contact γ of the input coupling device 10. The emerging component LT2 of light passes through a glass plate GP of the photodiode PD and onto its photosensitive surface LF so that the photosensitive surface LF is selected to have an area greater than the emergence region occupied by the light LT2. The center point of the photosensitive surface LF is offset by an angle β' which is preferably 7° to 15° to the axis of the incoming second light waveguide LW2 since this is the direction of maximum emerging light power. In the case of output coupling of light, thus, the same considerations and principles are applied as in the case of input-coupling. The light-sensitive surface LF lies approximately parallel to a tangent of the second waveguide LW2 at the angle of contact γ'. It is thereby guaranteed that no emerging light energy is lost through fadeout or the like. The photodiode PD converts the light into a photocurrent which is applied by the connecting lines AD1 and AD2 to the receiving circuit RC (FIG. 1). From the receiving circuit RC, the signal is then applied to a measuring apparatus MG.

The input coupling device 10 includes a base plate PL (FIG. 4). A stop part AN is secured to the base plate PL. This stop part AN has a slit SL in its upper region and the width of the slit is selected to be only slightly larger than that of the optical waveguide LW1. In an upper portion of the device 10, a covering AB is provided which surrounds the stop part AN and which has a guide FG for the pin or cylinder BO1. The pin BO1 is spring-mounted so that after applying the cover AB which acts as a lid, even in the case of varying fiber diameters, a tight contact pressing of the optical fiber LW1 into the coupling region KB is guaranteed.

Figure 5:
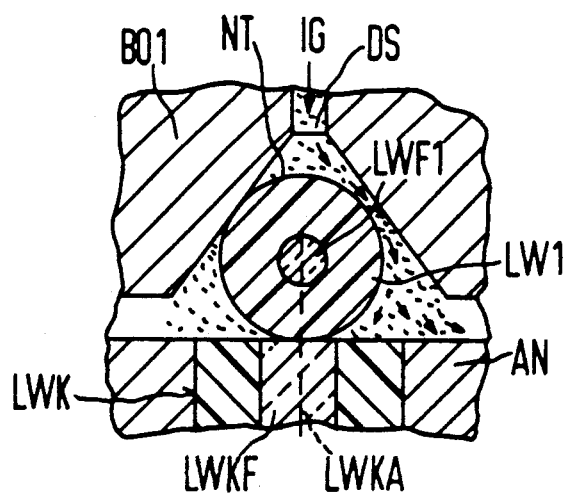
FIG. 5 is an enlarged partial transverse cross-sectional view of the device of FIG. 4.

The guide device FG in the interior has a reservoir VB which receives an immersion gel IG. The reservoir VB terminates in a nozzle DS through which the gel can emerge adjacent the lower edge or surface of the pin BO1 and thus enter the coupling region KB. As best illustrated in FIG. 5, which is an enlarged illustration, the emergence region in the case of the pin BO1 for the immersion gel IG is illustrated. The immersion gel IG passes over the optical waveguide LW1 and approaches the end face of the optical waveguide fiber LWFA of the additional optical fiber LWK and wets the latter.

The pin or cylinder BO1 is provided with a groove NT (best illustrated in FIG. 5) which extends around its circumference and which groove is precisely so deep that a coated optical fiber LW1 projects from it by about 10 to 20% of its diameter. The optical waveguide LWK which is illustrated in broken lines in FIG. 4 is received and secured in the interior of a metal pin MS which is received in an oblique bore in the interior of the stop part AN. The bore has the angular values which were discussed with regard to FIG. 2. The end of the metal pin MS together with the cemented-in optical waveguide LWK is correspondingly ground out, namely, such that the curvature of recess in the contact region of the pin BO1 corresponds to the external diameter of the pin BO1. Through the lateral guidance of the optical waveguide LW1 in the region of the vertical slit SL and through the takeover of the guide by the groove NT of the pin or bolt BO1, a precisely defined position for the first optical waveguide LW1 in the region of the stop part AN is guaranteed, namely, for one splicing operation to another and for one optical fiber relative to another. It is thereby possible to precisely define the coupling location between the first optical waveguide LW1 and the additional waveguide LWK in a manner described in greater detail with respect to FIG. 2 and thus to keep the input coupling attenuation as low as possible, so that as much light as possible passes from the core of the optical waveguide LWK into the core of the optical waveguide LW1 even if the latter represents a monomode fiber whose core diameter is particularly small.

The pin or cylinder BO1 is pressed with a certain contact pressure against the stop part AN which can advantageously proceed via a corresponding springy mounting of the metal pin BO1 in the guide FG. In order to introduce the optical waveguide LW1, the pin BO1 is moved upwardly counter to the spring force so that the narrow slit SL is available in its entirely. Then the optical waveguide LW1 can be inserted or threaded from above in a simple fashion. After insertion of the optical waveguide LW1, the pin BO1 is moved downwardly and thereby brings a portion of the optical waveguide LW1 through the guidance in the groove NT precisely to the coupling region KB where the optical waveguide LWK is fixedly secured. The input coupling of the light does not proceed via stray light but, on the contrary, direct radiation into the core of the optical waveguide LW1 is guaranteed so that the exact marginal conditions can be observed.

Although various minor modifications may be suggested by those versed in the art, it should be understood that I wish to embody within the scope of the patent granted hereon, all such modifications as reasonably and properly come within the scope of my contribution to the art.

I claim:

1. In a device for coupling light into a first optical waveguide before a splicing location between the first optical waveguide and a second optical waveguide for aiding in determining the splicing attenuation, said device including a source of light and means for guiding the first optical waveguide in a defined curved fashion to form a coupling region without requiring the removal of a coating on the first waveguide, the improvements comprising an additional optical waveguide for receiving light from said source, said additional optical waveguide having a core surrounded by a cladding, said additional optical waveguide extending to the coupling region with an end engaging said coupling region, and means for aligning a core region of the additional waveguide with a core of the first optical waveguide which is to be spliced.

2. In a device according to claim 1, wherein the core of the additional optical waveguide exhibits a larger diameter than the core of the first optical waveguide.

3. In a device according to claim 1, wherein the end of the additional optical waveguide has a curved surface with a contour corresponding to the curvature of the first optical waveguide in the coupling region.

4. In a device according to claim 1, wherein the curvature of the first optical waveguide in the coupling region runs in a circular arc formation.

5. In a device according to claim 4, wherein said circular arc formation has an angular range of between 20° and 50°.

6. In a device according to claim 1, wherein the means for guiding the first optical waveguide includes a stop part having a curved surface and a cylindrical member pressing the first optical waveguide against said curved surface.

7. In a device according to claim 6, wherein the cylindrical member has a groove for accommodating the first optical waveguide, said groove having a depth which is approximately 10 to 20% less than the outside diameter of the first optical waveguide.

8. In a device according to claim 6, wherein the cylindrical member has a diameter in the range of 1.5 and 6 mm.

9. In a device according to claim 6, wherein the device in a region of the cylindrical member includes a supply device for an immersion gel.

10. In a device according to claim 6, wherein the cylindrical member is pressed in a springy fashion against the stop part.

11. In a device according to claim 1, wherein the additional optical waveguide has an axis, said means for aligning positions the additional optical waveguide with an extension of the axis to intercept an axis of the first-mentioned waveguide at a coupling point.

12. In a device according to claim 11, wherein the axis of the additional optical waveguide intercepts the axis of the first optical waveguide at a coupling point arranged at an end of a curved region of the first waveguide.

13. In a device according to claim 11, wherein a tangent to a curved region of the first waveguide at the coupling point forms an angle $\beta$ with the axis of the additional optical waveguide, said angle $\beta$ being smaller than 90°.

14. In a device according to claim 13, wherein the angle $\beta$ is in a range of between 7° and 15°.

15. In a device according to claim 14, wherein angle $\beta$ is approximately 10°.

16. In a device according to claim 1, wherein the source of light is a luminescent diode.

17. In a device according to claim 1, which includes a device for output coupling light from the second optical waveguide comprising means for curving the second optical waveguide to form a curved coupling region including a cylindrical member engaging a portion of the second waveguide, a photodiode arranged in the curved coupling region of the second optical waveguide, said photodiode being connected to a measuring apparatus.

18. An apparatus for determining splicing attenuation at a splicing location between first and second optical waveguides by coupling light into the first optical waveguide before the splicing location and by removing light from the second optical waveguide, said apparatus including an input coupling device including a light source, means for holding the first optical waveguide in a curved fashion in a coupling region without requiring the removal of the coating of the first waveguide, and an additional optical waveguide with a cladded core for receiving light from the light source and conveying it to a coupling location, said additional optical waveguide having an end engaging the first optical waveguide with a core region aligned with a core of the first optical waveguide; and a device for coupling light from the second optical waveguide, said device for coupling light from the second optical waveguide including means for holding the second optical waveguide in a curved path a photodiode positioned adjacent to the means for holding to receive light coupled from the second optical waveguide and a measuring arrangement being connected to said photodiode for determining the quantity of light received by the photodiode.

19. A device for output coupling light from an optical waveguide comprising means for curving the optical waveguide to form a curved coupling region, said means including a cylindrical member engaging a portion of the waveguide, and a photodiode having a photosensitive surface with a center and being connected to a measuring apparatus, said photodiode being arranged in the curved coupling region of the optical waveguide with the photosensitive surface extending approximately parallel to a tangent to an end of the curved coupling region and said center being displaced from a second tangent at a commencement point of the curved coupling region so that a line from the center to said point forms an angle in a range of 7°–15° with the second tangent.

20. A device for coupling light into a first light waveguide preceding a splice location for the purpose of evaluating a splice attenuation, the first light waveguide on the outside being provided with a light transmitting coating for protection of a core of the light waveguide, said device comprising means for guiding the first light waveguide with a defined curvature in a coupling region, a source of light and an additional light waveguide with a cladded core extending between said source and the coupling region, said core of the additional light waveguide being aligned with the core of the first light waveguide and having an end contacting said first light waveguide in the coupling region to couple light from said source into said first light waveguide.

* * * * *